US008296112B2

(12) United States Patent
Tanaka (10) Patent No.: US 8,296,112 B2
(45) Date of Patent: Oct. 23, 2012

(54) FLOW SIMULATION METHOD, FLOW SIMULATION SYSTEM, AND COMPUTER PROGRAM PRODUCT

(75) Inventor: Masayuki Tanaka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 467 days.

(21) Appl. No.: 12/544,595

(22) Filed: Aug. 20, 2009

(65) Prior Publication Data

US 2010/0049489 A1 Feb. 25, 2010

(30) Foreign Application Priority Data

Aug. 22, 2008 (JP) ............................. P2008-214260

(51) Int. Cl.
*G06G 7/57* (2006.01)
*G06G 7/48* (2006.01)

(52) U.S. Cl. .................................... 703/9; 703/2; 703/6

(58) Field of Classification Search ................. 703/2, 9, 703/6
See application file for complete search history.

(56) References Cited

U.S. PATENT DOCUMENTS

| | | | | |
|---|---|---|---|---|
| 6,198,489 B1 * | 3/2001 | Salesin et al. | ................. | 715/784 |
| 7,526,415 B2 * | 4/2009 | Shan et al. | ........................ | 703/2 |
| 7,558,714 B2 * | 7/2009 | Shan et al. | ........................ | 703/9 |
| 7,707,016 B2 * | 4/2010 | Shaw | ................................ | 703/6 |
| 7,860,695 B2 * | 12/2010 | Fitch et al. | ........................ | 703/6 |
| 7,921,003 B2 * | 4/2011 | Miller et al. | ........................ | 703/9 |
| 7,930,155 B2 * | 4/2011 | Zhang et al. | ....................... | 703/9 |
| 7,949,503 B2 * | 5/2011 | Aldajani | ........................... | 703/6 |
| 8,065,090 B2 * | 11/2011 | Fitch et al. | ........................ | 702/19 |
| 8,082,108 B2 * | 12/2011 | Fitch et al. | ........................ | 702/19 |
| 8,099,265 B2 * | 1/2012 | Houston | ............................ | 703/9 |
| 2004/0167757 A1 * | 8/2004 | Struijs | ................................ | 703/2 |
| 2004/0181383 A1 * | 9/2004 | Yu et al. | ............................. | 703/9 |
| 2006/0169800 A1 * | 8/2006 | Rosell et al. | ................... | 239/418 |

(Continued)

FOREIGN PATENT DOCUMENTS

JP 7-334484 12/1995

(Continued)

OTHER PUBLICATIONS

B. A. Ashtiani, L. Farhadi, "A Stable moving-particle semi-implicit method for free surface flows", pp. 242-256, Elsevier 2005.*

(Continued)

*Primary Examiner* — David Silver
*Assistant Examiner* — Kibrom Gebresilassie
(74) *Attorney, Agent, or Firm* — Oblon, Spivak, McClelland, Maier & Neustadt, L.L.P.

(57) ABSTRACT

A system for a flow simulation using Moving Particle Semi-implicit method, includes a processor representing a target incompressible fluid by a plurality of particles grouped according to different particle sizes depending on a spatial resolution required at positions in a simulation domain; temporarily updating a velocity and a position coordinate of each particle to a first velocity and a first position coordinate by implicitly calculating a variation of the velocity of each particle due to a viscosity of the incompressible fluid in each of a plurality of time steps having a predetermined time interval; and updating the first velocity and the first position coordinate to a second velocity and a second position coordinate of each particle at a next time step of each time step by calculating a velocity correction of the first velocity due to a pressure gradient of the incompressible fluid using the first velocity.

6 Claims, 7 Drawing Sheets

U.S. PATENT DOCUMENTS

| | | | |
|---|---|---|---|
| 2006/0235659 A1* | 10/2006 | Stam | 703/2 |
| 2007/0239414 A1* | 10/2007 | Song et al. | 703/9 |
| 2008/0126045 A1* | 5/2008 | Shan et al. | 703/9 |
| 2008/0177519 A1* | 7/2008 | Miller et al. | 703/9 |
| 2011/0125684 A1* | 5/2011 | Al-Duwaish et al. | 706/19 |
| 2012/0065947 A1* | 3/2012 | Yu | 703/2 |

FOREIGN PATENT DOCUMENTS

| | | |
|---|---|---|
| JP | 2000-339292 | 12/2000 |
| JP | 2002-137272 | 5/2002 |

OTHER PUBLICATIONS

W. Hong, D. H. House, J. Keyser, "Adaptive Particles for Incompressible Fluid Simulation", pp. 1-10, 2007.*

B. A. Ashtiani, L. Farhadi, "A Stable moving-particle semi-implicit method for free surface flows", pp. 242-256, 2005.*

W. Hong, D. H. House, J. Keyser, "Adaptive Particles for Incompressible Fluid Simulation", pp. 1-10, 2007.*

S. Premoze, T. Tasdizen, J. Bigler, A. Lefohn, & R. Whitaker, "Partcile-Based Simulation of Fluid", Eurographics 2003, pp. 1-10.*

S. Koshizuka, A. Nobe, & Y. Oka, "Numerical Analysis of breaking waves using the moving particle semi-implicit method", pp. 751-769, 1998.*

Maruzen S. Koshizuka, "Particle Method", 2005, 3 pages.

E. Toyota, et al., "Numerical simulation of the flow around a high speed by a particle method with variable spatial resolution", The Conference of the Japan Society of Naval Architects and Ocean Engineers, 4. 2007, pp. 321-322.

* cited by examiner

| PARTICLE SIZE | PARTICLE NUMBER | | COMPUTATION TIME | |
|---|---|---|---|---|
| | EVEN | UNEVEN | EVEN | UNEVEN |
| TWO SIZES | 1176 | 888 | 16[m] 23[s] | 12[m] 9[s] |
| THREE SIZES | 2400 | 1368 | 36[m] 51[s] | 19[m] 5[s] |
| FOUR SIZES | 4704 | 2220 | 3[h] 46[m] | 1[h] 8[m] |
| FIVE SIZES | 9600 | 3696 | 17[h] 20[m] | 5[h] 20[m] |

FIG. 9

FLOW SIMULATION METHOD, FLOW SIMULATION SYSTEM, AND COMPUTER PROGRAM PRODUCT

CROSS REFERENCE TO RELATED APPLICATIONS AND INCORPORATION BY REFERENCE

This application is based upon and claims the benefit of priority from prior Japanese Patent Application P2008-214260 filed on Aug. 22, 2008; the entire contents of which are incorporated by reference herein.

BACKGROUND

1. Technical Field

Disclosure generally relates to a flow simulation method, a flow simulation system and a computer program product for simulating a behavior of an incompressible fluid.

2. Related Art

Currently, as one of methods to simulate a behavior of an incompressible fluid, so-called Moving Particle Semi-implicit (MPS) method is known. In the MPS method, an incompressible fluid is represented by a plurality of particles having an even size, and behaviors of the particles are computed by using a computer. The MPS method is suitable for a behavior simulation of a free surface flow, particularly a matter which can be dynamically deformed or split and merged. Thus, the MPS method is widely used in various technical fields, such as a plant, an aviation, a ship, environment, including an atomic energy.

In the current MPS method, it is impossible to change sizes of the particles, which corresponds to the spatial resolution, in the simulation domain. For this reason, when simulating a behavior of an incompressible fluid in a flow path having a very small ditch, particles each having an even size determined in accordance with the length scale of the ditch must be provided in the simulation domain. Out of such a background, since a great number of particles (calculation points) are provided in the simulation domain when the behavior of the incompressible fluid in which the length scale in the simulation domain significantly changes is analyzed, it is difficult to perform the flow simulation within a practical time frame due to constraint on the throughput of a computer.

SUMMARY

An aspect of the present disclosure includes in a system for simulating a flow of an incompressible fluid, using Moving Particle Semi-implicit method, the system including a processor configured to simulate an incompressible fluid represented by a plurality of particles, the particles are grouped according to different particle sizes depending on a spatial resolution required at positions in a simulation domain, the processor includes; a viscosity term calculation logic-circuit configured to implicitly calculate a variation of a velocity of each of the particles due to a viscosity of the incompressible fluid in each of time steps having a predetermined time interval, a particle movement tracing logic-circuit configured to temporarily update the velocity and a position coordinate of each of the particles—to a first velocity and a first position coordinate based on the variation of the velocity, a pressure term calculation logic-circuit configured to calculate a velocity correction of the first velocity due to a pressure gradient of the incompressible fluid using the first velocity, and a particle data update logic-circuit configured to update the first velocity and the first position coordinate to a second velocity and a second position coordinate of each of the particles at a next time step of each of the time steps based on the velocity correction, and an initialization data memory configured to store various parameters for executing the flow simulation, the parameters including each initial particle size, each initial position coordinate of the particles, each initial velocity of the particles, each initial pressure of the particles, a viscosity of the incompressible fluid, and the time interval of the time step.

Another aspect of the present disclosure includes in a computer implemented method for simulating a flow of an incompressible fluid, using Moving Particle Semi-implicit method, the method including representing an incompressible fluid by a plurality of particles, the particles are grouped according to different particle sizes depending on a spatial resolution required at positions in a simulation domain; temporarily updating a velocity and a position coordinate of each of the particles to a first velocity and a first position coordinate by implicitly calculating a variation of the velocity of each of the particles due to a viscosity of the incompressible fluid in each of time steps having a predetermined time interval; and updating the first velocity and the first position coordinate to a second velocity and a second position coordinate of each of the particles at a next time step of the time steps by calculating a velocity correction of the first velocity due to a pressure gradient of the incompressible fluid using the first velocity.

Still another aspect of the present disclosure includes in a computer program stored on a computer-readable medium of a computer and configured to be executed by a computer for simulating a flow of an incompressible fluid, using Moving Particle Semi-implicit method, the computer program product including instructions configured to represent an incompressible fluid by a plurality of particles, the particles are grouped according to different particle sizes depending on a spatial resolution required at positions in a simulation domain; instructions configured to temporarily update a velocity and a position coordinate of each of the particles to a first velocity and a first position coordinate by implicitly calculating a variation of the velocity of each of the particles due to a viscosity of the incompressible fluid in each of time steps having a predetermined time interval; and instructions configured to update the first velocity and the first position coordinate to a second velocity and a second position coordinate of each of the particles at a next time step by calculating a velocity correction of the first velocity due to a pressure gradient of the incompressible fluid using the first velocity.

DETAILED DESCRIPTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Configuration of Flow Simulation System)

Figure 1:
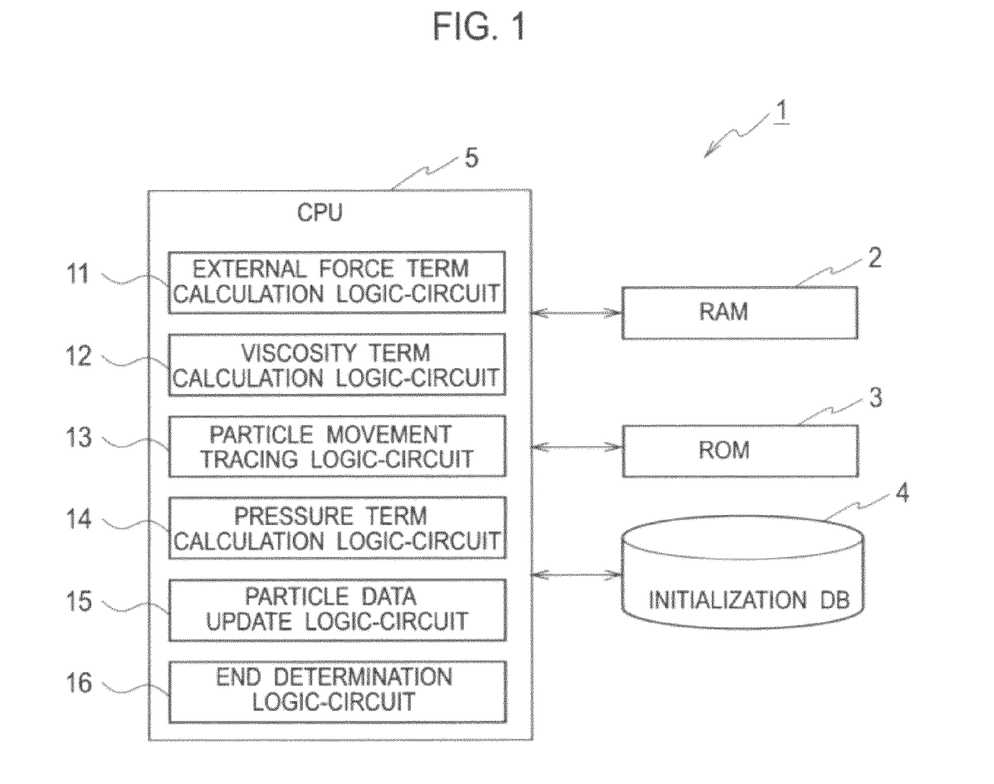
FIG. 1 is a block diagram showing an example of a configuration of a flow simulation system according to an embodiment of the present invention.

A flow simulation system 1 according to an embodiment of the present invention may be set up by a known information processing unit, such as a personal computer, a work station, and a general-purpose computer. As shown in FIG. 1, the flow simulation system 1 includes a random access memory (RAM) 2, a read only memory (ROM) 3, initialization data memory (database, DB) 4, and a processor (central processing unit, CPU) 5, as main components. The RAM 2 provides a working area temporarily storing a computer program executed by the CPU 5, such as a boot program or a flow simulation program, of the flow simulation system 1, and various data. The ROM 3 stores the computer program and various data required for executing the computer program. In addition, the ROM 3 may include a computer-readable storage medium by the CPU 5, such as a magnetic or optical storage medium, a semiconductor memory, and the like. Furthermore, the computer program and the various data in whole or in part stored in the ROM 3 may be downloaded through an electric telecommunication line.

Specifically, information on initial conditions, such as an initial value $r_{ini}$ of a particle diameter (size) $r_i$ of a particle i in the MPS method, a position (a coordinate of the center of gravity), a velocity, a temperature, a pressure, physical properties of fluid (for example, viscosity, density, thermal conductivity, specific heat, latent heat, and the like), an interval $\Delta t$ of a time step, a computation ending time T, and the like, are included in the parameters. The CPU 5 controls whole processing of the flow simulation system 1 by loading the computer program stored in the ROM 3 to the RAM 2, and by executing the computer program retrieved from the RAM 2. Specifically, the CPU 5 loads the flow simulation program and the data required for executing the flow simulation program stored in the ROM 3 to the RAM 2, and executes the flow simulation using the MPS method through the flow simulation program. In the embodiment of the present invention, the CPU 5 includes an external force term calculation logic-circuit 11, a viscosity term calculation logic-circuit 12, a particle movement tracing logic-circuit 13, a pressure term calculation logic-circuit 14, a particle data update logic-circuit 15, and an end determination logic-circuit 16, in order to execute the flow simulation program stored in the ROM 3. Functions of the respective logic-circuits will hereinafter be described in detail.

(Flow Simulation Method)

The flow simulation system 1 having such a configuration can simulate a behavior of an incompressible fluid in a simulation domain, in which the length scale dynamically varies, with a practical time by executing a flow simulation processing provided below. The flow simulation processing executed by the flow simulation system 1 will be described in detail with reference to a flowchart shown in FIG. 2.

Figure 2:
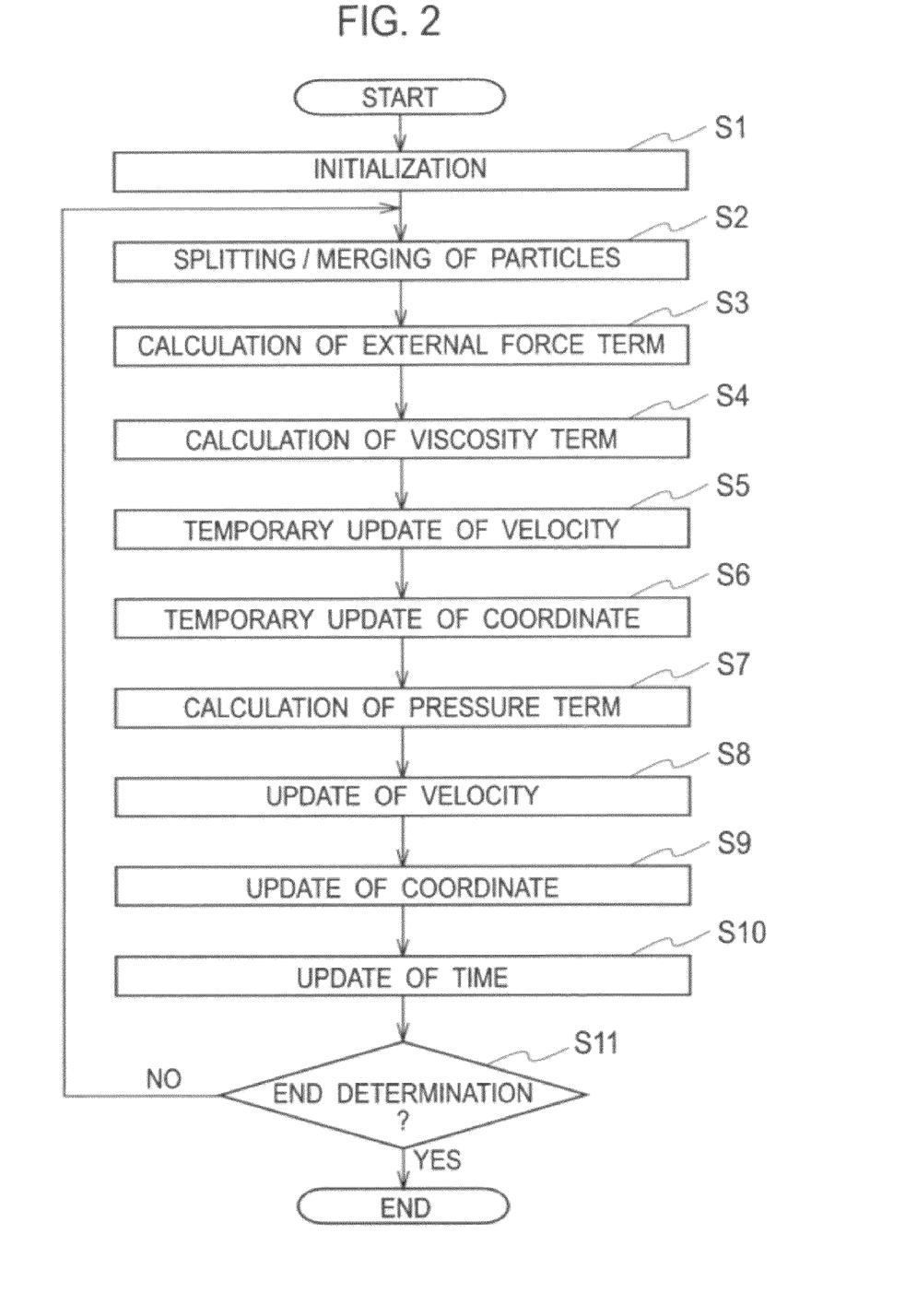
FIG. 2 is a flowchart showing an example of processing of a flow simulation according to the embodiment of the present invention.

The flowchart shown in FIG. 2 is initiated when an operator has instructed the flow simulation system 1 to start the flow simulation processing. The flow simulation processing advances to Act S1.

In Act S1, the CPU 5 reads out physical properties of an incompressible fluid to be simulated, calculation condition parameters, such as the interval $\Delta t$ of the time step, the computation ending time T, and the like, and initial condition parameters, such as sizes of particles, initial position coordinates, velocity, temperature, and the like, in the RAM 2 from the initialization DB 4. The incompressible fluid is represented by a plurality of particles, which are grouped according to different particle sizes based on the read parameters. Specifically, the CPU 5 arranges particles having a small size in a region where a high resolution is required, and particles having a large size in a region where a high resolution is not required. Thus, processing in Act S1 is completed, and the flow simulation processing advances to Act S2.

In Act S2, the CPU 5 spatially changes the resolution of the incompressible fluid by splitting or merging the particles so that the particles have appropriate sizes at the current position coordinate. Specifically, when a current particle size $L_i$ of the particle i is about two times larger than the ideal particle size $L^*$ of the particle i at the position coordinate, the CPU 5 splits the particle i in two so as to reduce the particle size of the particle i. On the other hand, when the particle size $L_i$ is about ½ times smaller than the ideal particle size $L^*$, the CPU 5 merges a particle j in the nearest neighbor with the particle i so as to increase the particle size $L_i$ of the particle i. In addition, the particle size newly generated by splitting or merging is determined so as to conserve volume of the particle. Thus, processing in Act S2 is completed, and the flow simulation processing advances to Act S3.

In Act S3, the external force term calculation logic-circuit explicitly calculates an external force term, such as gravity and the like, directly affecting each particle. Since the calculation method of the external force term in the particle method is heretofore known at the time of filing of the present invention, detailed description is omitted. Thus, processing in Act S3 is completed, and the flow simulation processing advances to Act S4.

In Act S4, the viscosity term calculation logic-circuit 12 calculates the viscosity term, and then calculates velocity diffusion of each particle due to the viscosity, by distributing the velocity distribution of a particle i to a neighboring particle j. Specifically, the viscosity term is expressed by Equation (1) below. Parameters u, t, and v in Equation (1) denote a velocity vector, a time, a kinematic coefficient of viscosity, respectively. When discretizing Equation (1) using a particle method, the viscosity term is expressed explicitly by Equation (2), or implicitly by Equation (3). Parameters d, $\lambda$, $n^0$, $w_{ij}$, and k in Equations (2), (3) denote the number of dimensions, a coefficient for adjusting the variation of the diffusion in the analytical solution, a reference particle number density, a weight of interaction between particles i, j, and a time step, respectively.

$$\frac{d\vec{u}}{dt} = \nu \nabla^2 \vec{u} \quad (1)$$

$$\frac{\Delta \vec{u}_i}{\Delta t} = \nu \frac{2d}{\lambda n^0} \sum_{j \neq i} [(\vec{u}_j^k - \vec{u}_i^k) w_{ij}] \quad (2)$$

$$\frac{\Delta \vec{u}_i}{\Delta t} = \nu \frac{2d}{\lambda n^0} \sum_{j \neq i} [(\vec{u}_j^{k+1} - \vec{u}_i^{k+1}) w_{ij}] \quad (3)$$

A velocity variation Δu of the particle i due to the viscosity is expressed by Equation (4) below. Simultaneous linear equations, shown in Equation (5) below, are derived by substituting Equation (4) into Equation (3). In the present embodiment, the viscosity term is implicitly solved by a weight $w_{ij}$ providing a magnitude of interaction between the particles using an interaction radius R, as shown in Equation (5). The interaction radius R is defined as a radius of an interaction area in which the interaction between the particles extends. Thus, even if a time interval of the time step k increases, the calculation of the viscosity may be implemented stably without divergence.

$$\Delta \vec{u}_i = \vec{u}_j^{k+1} - \vec{u}_i^k \quad (4)$$

$$\left[\nu \frac{2d}{\lambda n^0} \sum_{j \neq i} (w_{ij}) + 1 \right] \vec{u}_i^{k+1} - \nu \frac{2d}{\lambda n^0} \sum_{j \neq i} (\vec{u}_j^{k+1} w_{ij}) = \frac{\vec{u}_i^k}{\Delta t} \quad (5)$$

In the present embodiment, the weight $w_{ij}$ between the particles i and j is different from the weight in the conventional MPS method. As shown in Equation 6(a) below, the weight $w_{ij}$ is a product of a weight function w, which is expressed using a distance between the particles i, j and an arithmetic average of interaction radii $R_i$, $R_j$ of the particles i and j, and a volume ratio $V_j/V_i$ of the particle j to the particle i. Here, the distance $|r_j - r_i|$ is denoted by "A", and the arithmetic average $[(R_i + R_j)/2]$ is denoted by "B". As shown in Equation 6(b) below, the weight function w(A, B) is a divided value of a difference between the distance A and the arithmetic average B by the distance A when the distance A is equal to or less than the arithmetic average B, and zero when the distance A is greater than the arithmetic average B. Note that, in Equations (6a), (6b), $V_i$ and $V_j$ denote volumes of the particles i and j, $r_i$ and $r_j$ denote position coordinates of the particles i and j, and $R_i$ and $R_j$ denote interaction radii of the particles i and j, respectively. Thus, processing in Act S4 is completed, and the flow simulation processing advances to Act S5.

$$w_{ij} = \frac{V_j}{V_i} w \left( |\vec{r}_j - \vec{r}_i|, \frac{R_i + R_j}{2} \right) \quad (6a)$$

$$w(A, B) = \begin{cases} \frac{B - A}{A} & (A \leq B) \\ 0 & (A > B) \end{cases} \quad (6b)$$

In Act S5, the particle movement tracing logic-circuit 13 temporarily updates the velocity of each particle based on a calculation result in Act S3 and Act S4. Thus, processing in Act S5 is completed, and the flow simulation processing advances to Act S6.

In Act S6, the particle movement tracing logic-circuit 13 traces the movement of the particles during the interval Δt using the temporarily updated velocity in Act S5, and temporarily updates the position coordinate of each particle based on the tracing result. Thus, processing in Act S6 is completed, and the flow simulation processing advances to Act S7.

In Act S7, the pressure term calculation logic-circuit 14 calculates a particle number density in each position coordinate calculated in Act S6, and determines whether the calculated particle number density is a predetermined value. As a result of determination, when the particle number density is not the predetermined value, the pressure term calculation logic-circuit 14 modifies the position coordinate and the velocity of each particle by modifying the pressure so that the particle number density is the predetermined value. Furthermore, the pressure term calculation logic-circuit 14 calculates a pressure term caused by the modified pressure. Specifically, the pressure term calculation logic-circuit 14 calculates the pressure term using a Poisson equation for pressure represented by Equation (7) below. In general, the Poisson equation for pressure is represented by using the reference particle number density based on the incompressibility condition in which the particle number density is fixed. However, in the present embodiment, the Poisson equation for pressure is represented without the use of the reference particle number density, based on the incompressibility condition in which the divergence of the velocity field is zero, as shown in Equation (7). Thus, processing in Act S7 is completed, and the flow simulation processing advances to Act S8.

$$\nabla^2 P = \frac{\rho}{\Delta t} \nabla \cdot \vec{u}_i^* \quad (7)$$

Note that ρ denotes the fluid density, and $\vec{u}_i^*$, denotes the velocity before calculating the pressure term.

In Act S8, the particle data update logic-circuit 15 updates the velocity of each particle stored in the RAM 2 based on the calculation result in Act S7. Thus, processing in Act S8 is completed, and the flow simulation processing advances to Act S9.

In Act S9, the particle data update logic-circuit 15 updates the position coordinate of each particle stored in the RAM 2 based on the calculation result in Act S7. Thus, processing in Act S9 is completed, and the flow simulation processing advances to Act S10.

In Act S10, the end determination logic-circuit 16 increments the analysis time by the interval Δt of the time step. Thus, processing in Act S10 is completed, and the flow simulation processing advances to Act S11.

In Act S11, the end determination logic-circuit 16 determines whether the analysis time t is the computation ending time T. As a result of determination, when the analysis time t is the computation ending time T, the end determination logic-circuit 16 writes the particle data stored in the RAM 2 on a predetermined file retrieved from the ROM 3, and exits a series of the flow simulation processing. On the other hand, when the analysis time t is less than the computation ending time T, the end determination logic-circuit 16 returns the flow simulation processing to Act S2, and the flow simulation processing is repeated. Thus, a behavior of the incompressible fluid is determined.

Figure 3:
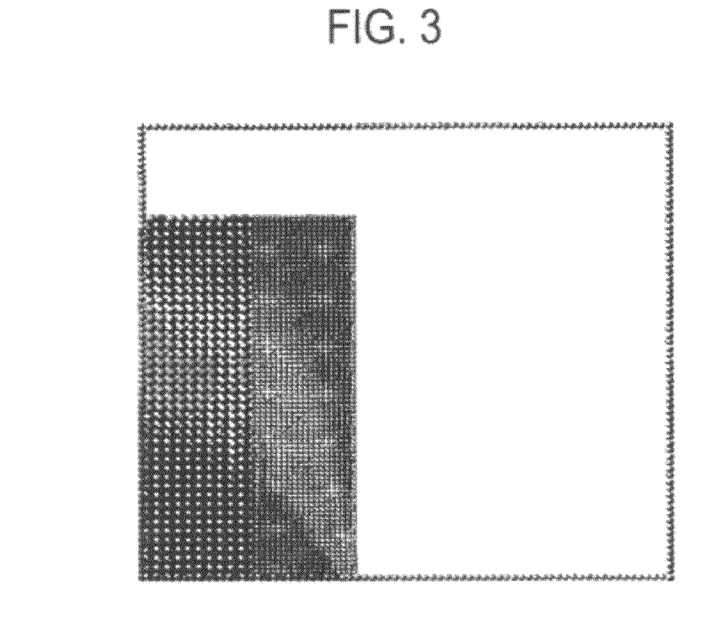
FIG. 3 is a diagram showing an example of an analyzed pressure distribution of an incompressible fluid presented by a plurality of particles having different particle sizes using the current flow simulation processing.
Figure 4:
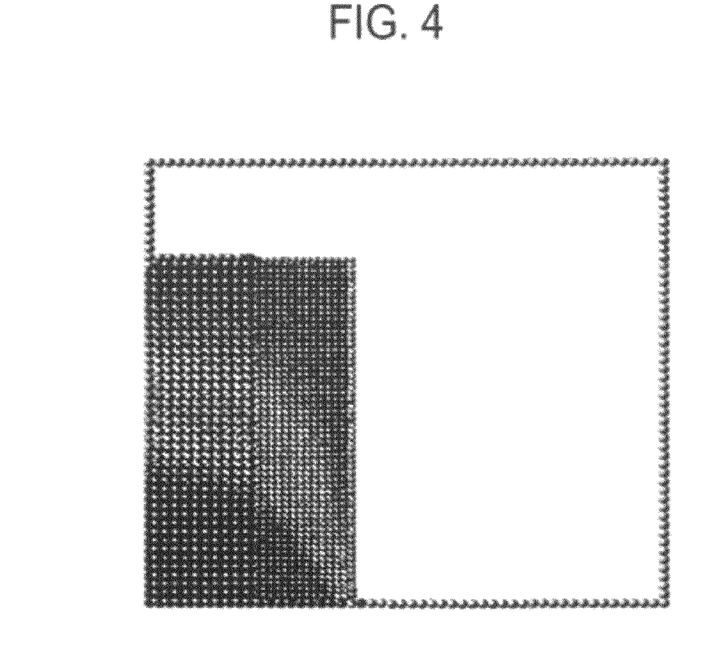
FIG. 4 is a diagram showing an example of an analyzed pressure distribution of an incompressible fluid presented by a plurality of particles having different particle sizes using a flow simulation processing according to the embodiment of the present invention.
Figure 5A:
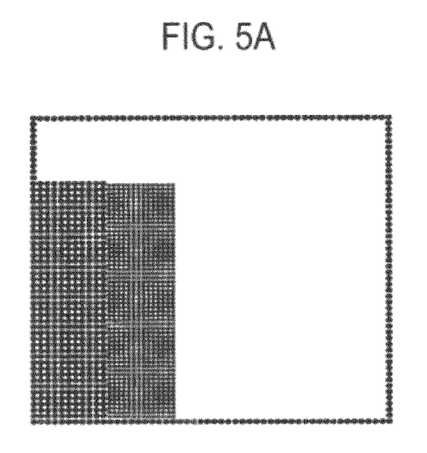
FIGS. 5A-5D are diagrams showing an example of a result of the current flow simulation when a condition of incompressibility where a divergence of a velocity field is zero is not provided.
Figure 5B:
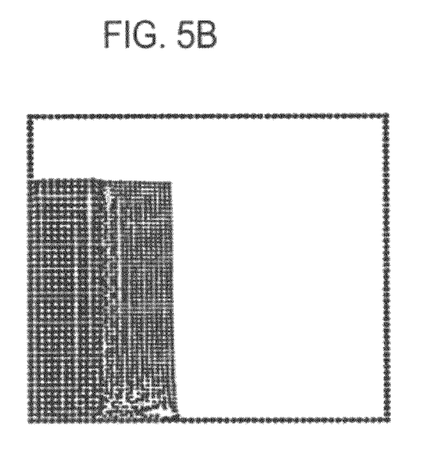
Figure 5C:
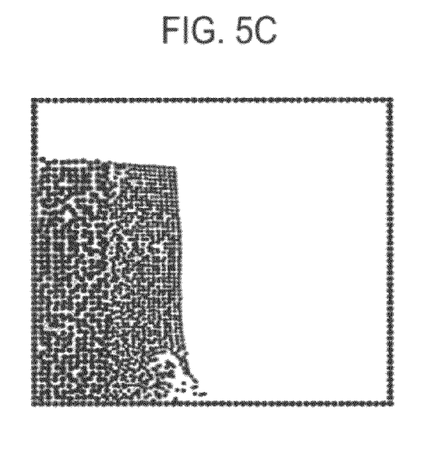
Figure 5D:
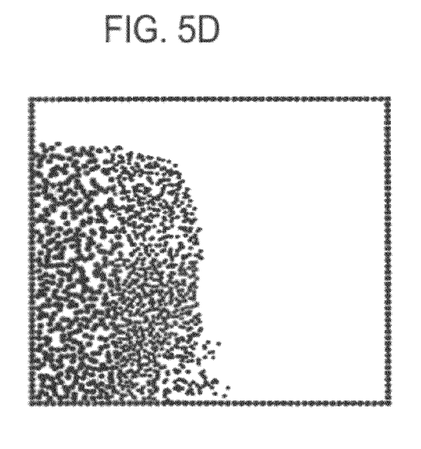
Figure 6A:
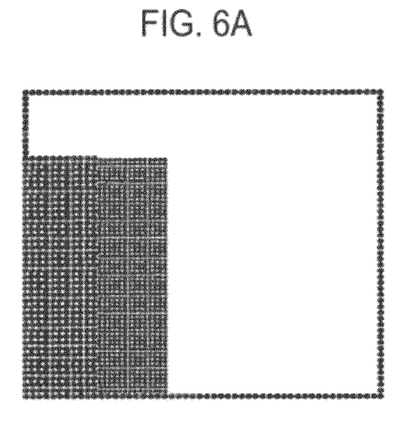
FIGS. 6A-6C are diagrams showing an example of a result of the flow simulation according to the embodiment of the present invention when a condition of incompressibility where a divergence of a velocity field is zero is provided.
Figure 6B:
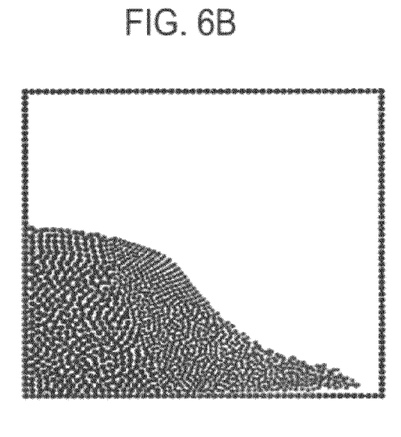
Figure 6C:
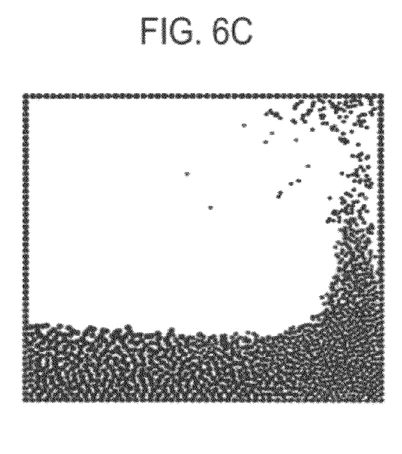

When an incompressible fluid has been represented by groups of a plurality of particles, each group having a different particle diameter, in a flow simulation using the conventional MPS method, the inventor of the present invention has confirmed that the pressure value has spatially oscillated, as shown in FIG. 3. As a result of studying diligently, in a case using the weight shown in Equations (6a), (6b), the smooth pressure distribution has been provided as shown in FIG. 4. Additionally, as shown in FIGS. 5A, 5B, 5C and 5D, the computation has been unstable when the particle sizes are different more than 1.5 times between the particles. On the contrary, as shown in FIGS. 6A, 6B and 6C, the computation stability has drastically improved by the flow simulation with the incompressibility condition in which the divergence of a velocity field is zero.

Thus, in the present embodiment, the flow simulation is performed using the weight shown in Equation (6a), (6b), with the incompressibility condition in which the divergence of the velocity field is zero. As a result, it is possible to reduce a computation time required for behavior analysis of the incompressible fluid in which the length scale in the simulation domain significantly changes.

EXAMPLE

Figure 7A:
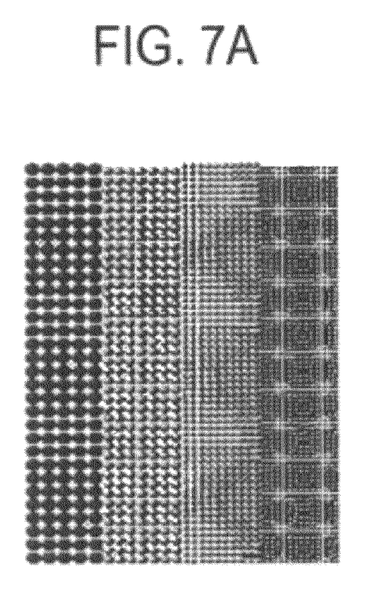
FIGS. 7A and 7B are diagrams showing an example of a result of the flow simulation according to the embodiment of the present invention using a model in which particles of four sizes are mixed.
Figure 7B:
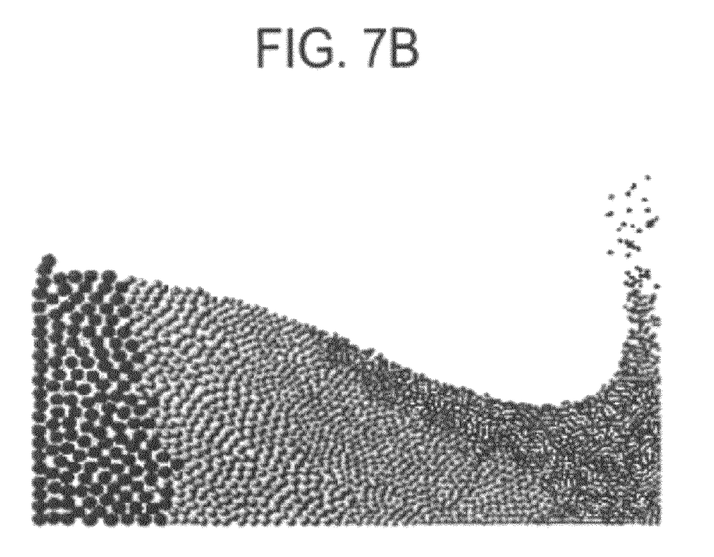
Figure 8:
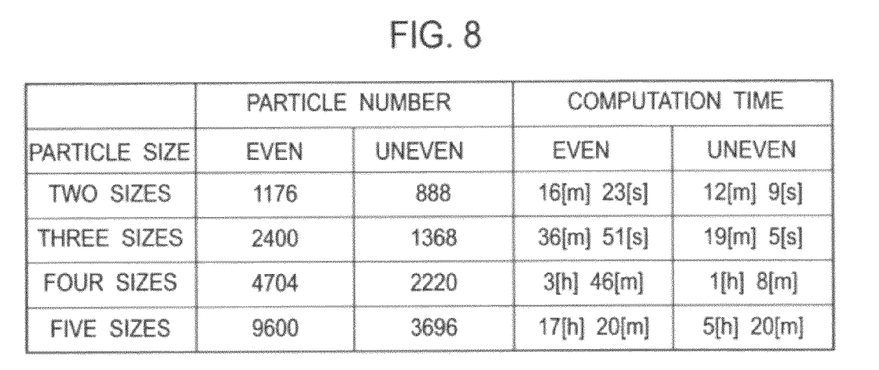
FIG. 8 is a table showing examples of a particle number and computation time for the flow simulation according to the embodiment of the present invention using models having uneven particle sizes and even particle size.

Advantages of a flow simulation method according to the present embodiment will be given using an analysis of a dam break problem. FIGS. 7A and 7B show an simulation result using a model for a dam break analysis, in which particles having four different particle sizes are used. Furthermore, FIG. 8 shows required particle numbers and computation times for simulates with changing the number of particle sizes used in the simulation from two to five. As shown in FIG. 8, the larger the number of particle size is used, the more efficient the calculation is. For example, the computation time is decreased to less than ⅓ in the case using four or five particle sizes, compared with using even particle size.

Figure 9:
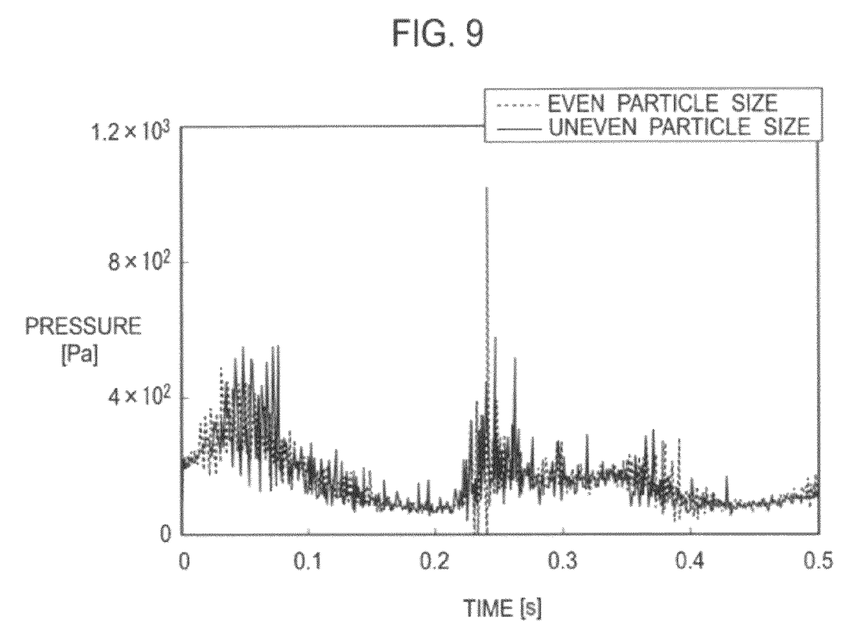
FIG. 9 is a diagram showing an example of a pressure variation in time by the flow analysis according to the embodiment of the present invention using models having uneven particle sizes and even particle size.

In addition, changes of the pressure at the point in the lower right of the container shown in FIG. 7B are calculated. As shown in FIG. 9, it has been confirmed that the change of the pressure by the case using the particles having different particle sizes (uneven particle size) is almost the same as the case using the particles having the same particle size (even particle size). Thus, according to the flow simulation method of the embodiment, it is possible to decrease the computation cost with keeping the required accuracy.

The above mentioned descriptions and drawings that constitute a portion of this disclosure should not be perceived as limiting this invention. Various alternative embodiments and operational techniques will become clear to persons skilled in the art from this disclosure.

The flow simulation system 1 according to the embodiment of the present invention may include a communication tool, such as a modem, so as to have the ability of accessing the telecommunication line, such as internet. In such case, the flow simulation program used in the embodiment may be stored in the RAM 2 or the ROM 3 by downloading the flow simulation program through the telecommunication line. In addition, the download program for downloading the flow simulation program through the telecommunication line may be preliminary stored in the ROM 3, or installed into the ROM 3 from the other storage medium.

Various modifications will become possible for those skilled in the art after storing the teachings of the present disclosure without departing from the scope thereof.

What is claimed is:

1. A computer implemented method for simulating a flow of incompressible fluid, using a particle method, the method comprising:

representing an incompressible fluid by a plurality of particles, the particles are grouped according to different particle sizes depending on a spatial resolution required at positions in a simulation domain;

temporarily updating a velocity and a position coordinate of each of the particles to a first velocity and a first position coordinate by implicitly calculating a variation of the velocity of each of the particles due to a viscosity of the incompressible fluid in each of time steps having a predetermined time interval; and updating the first velocity and the first position coordinate to a second velocity and a second position coordinate of each of the particles at a next time step of the time steps by calculating a velocity correction of the first velocity due to a pressure gradient of the incompressible fluid using the first velocity, wherein the velocity correction is calculated with an incompressibility condition where a divergence of the first velocity of each of the particles is zero, wherein the variation due to the viscosity is calculated by a weight providing a magnitude of interaction between the particles using an interaction radius of each of the particles and a volume of each of the particles, the interaction radius defined as a radius of an interaction area in which the interaction between the particles extends, wherein the weight wij between particles i and j among the particles is zero when a distance A between the particles i and j is greater than an arithmetic average B of interaction radii of the particles i and j, and the weight wij is a product of a divided value of a difference between the distance A and the arithmetic average B by the distance A and a volume ratio of the particle j to the particle i when the distance A is equal to or less than the arithmetic average B.

2. The method of claim 1, further comprising spatially changing resolution of the incompressible fluid by splitting or merging the particles.

3. The method of claim 1, wherein the particle method is Moving Particle Semi-implicit method.

4. A computer program product stored on a non-transitory computer-readable medium of a computer and configured to be executed by a computer for simulating a flow of incompressible fluid, using a particle method, the computer program product comprising:

instructions configured to represent an incompressible fluid by a plurality of particles, the particles are grouped according to different particle sizes depending on a spatial resolution required at positions in a simulation domain;

instructions configured to temporarily update a velocity and a position coordinate of each of the particles to a first velocity and a first position coordinate by implicitly calculating a variation of the velocity of each of the particles due to a viscosity of the incompressible fluid in each of time steps having a predetermined time interval; and instructions configured to update the first velocity and the first position coordinate to a second velocity and a second position coordinate of each of the particles at a next time step of the time steps by calculating a velocity correction of the first velocity due to a pressure gradient of the incompressible fluid using the first velocity, wherein the velocity correction is calculated with an incompressibility condition where a divergence of the first velocity of each of the particles is zero, wherein the variation due to the viscosity is calculated by a weight providing a magnitude of interaction between the particles using an interaction radius of each of the particles and a volume of each of the particles, the interaction radius defined as a radius of an interaction area in which the interaction between the particles extends, wherein the weight wij between particles i and j among the particles is zero when a distance A between the particles i and j is greater than an arithmetic average B of interaction radii of the particles i and j, and the weight wij is a product of a divided value of a difference between the distance A and the arithmetic average B by the distance A and a volume ratio of the particle j to the particle i when the distance A is equal to or less than the arithmetic average B.

5. The computer program product of claim 4, further comprising instructions configured to spatially change resolution of the incompressible fluid by splitting or merging the particles.

6. The computer program product of claim 4, wherein the particle method is Moving Particle Semi-implicit method.

* * * * *